H. SWAIN.
WATERPROOF FABRIC AND PROCESS OF MANUFACTURING SAME.
APPLICATION FILED AUG. 21, 1909.
1,152,349. Patented Aug. 31, 1915.
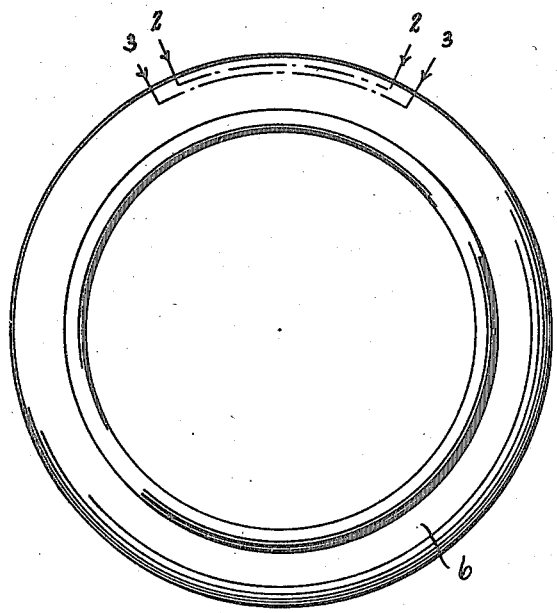
Fig. 1.
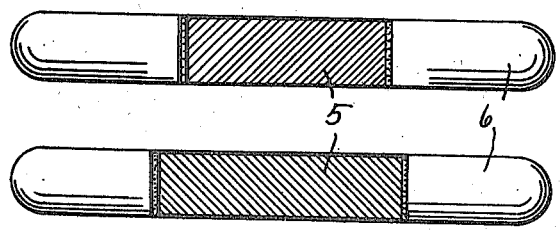
Fig. 2.
Fig. 3.
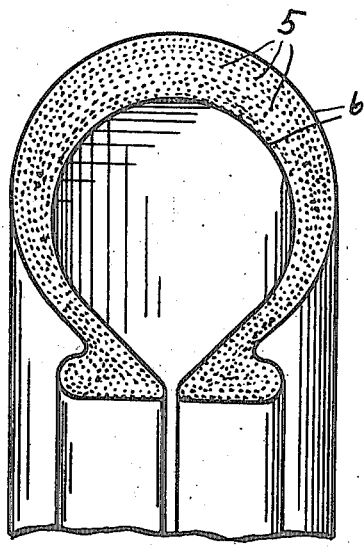
Fig. 4.
WITNESSES
INVENTOR
HADWEN SWAIN
by
Attorney

UNITED STATES PATENT OFFICE.

HADWEN SWAIN, OF SAN FRANCISCO, CALIFORNIA.

WATERPROOF FABRIC AND PROCESS OF MANUFACTURING SAME.

1,152,349.	Specification of Letters Patent.	Patented Aug. 31, 1915.

Application filed August 21, 1909. Serial No. 514,057.

*To all whom it may concern:*

Be it known that I, HADWEN SWAIN, a citizen of the United States, residing in the city and county of San Francisco, State of California, have invented new and useful Improvements in Waterproof Fabrics and Processes of Manufacturing Same, of which the following is a specification.

My invention has for its object a process of making various water proof articles that at present are made partly or wholly of rubber or leather, for instance tires which should be practically non-puncturable and non-skidding, heels for shoes which require good wearing surface and freedom from slipping together with various other articles.

I am aware that various inventions have been made to accomplish the above results, for instance various forms of cloth or twisted or braided strings have been laid back and forth with a certain prearrangement and then soaked with liquid rubber or placed over or under sheets of rubber. In all of the above methods the twisting, braiding or weaving not only prevents the liquid rubber or sheet rubber from reaching each hair or staple but leaves distinct and well defined interstices which might allow a puncture to be made, I therefore disclaim all of the above processes.

I am also aware that locks of cotton wool or animal locks have been coated with balata rubber characterized by the feature that the materials are precipitated from their solution upon the locks by chemical means, this also I disclaim.

I am also aware that two or more sheets of cotton wool have been laid crosswise at right angles and then soaked with gelatin, glue or some equivalent gelatinous substance which has been allowed to absorb as much water as possible and then dried.

None of the above articles or methods will produce the product described in the following specification. I therefore disclaim them.

In carrying out my process I use a loose staple of cotton wool or similar hair or thread-like material that has previously been made absorbent and a suitable adhesive material made from dissolving rubber or caoutchouc to form a liquid rubber or rubber cement, and the like; the staple or hairs being distributed in thin layers, the fiber or hairs of one or more layers being angularly disposed to the fiber or hairs of next one or more layers adjacent thereto.

In the drawings forming a part of this application I have illustrated my invention as applied to the construction of an outer casing for automobile tires.

In the drawings Figure 1 is a side elevation of an outer casing. Figs. 2 and 3 are edge elevations with parts removed for clearness of illustration. Fig. 4 is a cross section of a fragment of a casing.

The process is as follows:—Loose staple or hairs of absorbent material 5, preferably absorbent cotton similar to that used by surgeons, is prepared in thin layers, the main portion of the staple or hairs lying in the same direction. A sufficient number of these are piled together to produce a mass that will be easily impregnated when submerged in liquid rubber. These layers of fiber are so arranged that the general direction of the principal portion of the staple or hairs of the fiber of one layer is angularly disposed to the principal portion of the staple or hairs of the fiber of the adjacent layer. By this arrangement should there be any lumps in any of the layers they will be compressed into the adjacent layers and the contacting points of the fiber of the different layers is held in contact until bonded by the rubber solution when vulcanized as hereafter explained and when vulcanized the completed material forms a unitary body not lying in strata of rubber and fiber. Where tensile strength is required of the manufactured article, the main portion of the fiber of one layer will be arranged at right angles to that of the adjacent layer. When a sufficient number of layers have been piled together they are placed upon a wire screen and submerged in liquid rubber until the rubber thoroughly permeates the fiber. I have found in practice, when the layers are not too thick that the fiber will be impregnated in about twelve hours. The screens containing the fiber are then raised out of the liquid rubber and the excess of rubber pressed out of the fiber in any desirable way. I have found that by the use of a second screen on top of the fiber and applying pressure thereto the excess of rubber can be pressed out, the amount of pressure being governed by the amount of rubber to be left in the fiber. The material thus prepared may be termed sheets.

I have found in practice that six very thin layers of fiber form a convenient number for submergence in the rubber, and that if too many layers are used they will not become thoroughly permeated with the rubber. A sufficient number of sheets to produce the desired thickness of the manufactured article are placed together in a press and are vulcanized while under pressure by a heat equal to a pressure of 45 pounds to 60 pounds to the square inch depending upon the use of the material, the thickness and the amount of cotton wool in it.

By vulcanizing the sheets under pressure the staple or hairs are held by the vulcanized rubber 6 in its compressed condition and is so dense that it is almost impossible to force an awl through a piece of material thus prepared a quarter of an inch thick, and the fabric is practically water proof. One of the important uses to which the manufactured article can be put is outer casings or inner tubes for automobile tires, as such material is practically puncture proof. Where simply a wearing surface is desired such as in heels for boots and shoes the material would be prepared with the layers of fiber lying at acute angles with each other instead of at right angles, and it would be cut for heels so as to present the ends of the staples or hairs as nearly as possible to the surface of the ground. I have found in practice that automobile wheels in which the outer casing is covered with this material are less liable to skid than with an ordinary rubber tire. I have also found that shoes provided with heels of this material are not as liable to slip on wet pavements as if provided with leather or ordinary rubber heels.

Having described my invention what I claim is:—

1. The process of manufacturing water proof fabric which consists of preparing the material out of a plurality of layers of loose staples or hairs of absorbent fiber, each layer having the principal portion of the staple or hairs thereof lying in the same direction, the alternate layers being arranged so that the principal portion of the staple or hairs are angularly disposed as to the principal portion of the staple or hairs of the adjacent layer or layers, then impregnating the fiber with liquid rubber, then subjecting the impregnated fiber to pressure and pressing out the excess of rubber, if any, and then vulcanizing while under pressure by using a heat equal to a pressure of from 45 to 60 pounds to the square inch.

2. As a new article of manufacture, a water proof fabric composed of a plurality of layers of loose staple or hairs of absorbent fiber, each layer having the principal portions of the staple or hairs thereof angularly disposed as to the principal portion of the staple or hairs of the one or more adjacent layers and all the layers impregnated with liquid rubber, and then compressed to press out the excess of liquid rubber, if any, and then vulcanized while under pressure.

3. A water proof fabric composed of loose staple or hairs of absorbent fiber impregnated with rubber placed under pressure and vulcanized, the fiber being arranged in thin layers with the fiber of the alternate layers angularly disposed as to the fiber of the adjacent layers.

4. A water proof fabric composed of absorbent cotton arranged in thin layers and impregnated with liquid rubber, the staple of each layer lying in the same direction and the staple of any two adjacent layers being angularly disposed as to each other, said layers being compressed and vulcanized while under pressure.

In witness that I claim the foregoing I have hereunto subscribed my name this 24th day of July, 1909.

HADWEN SWAIN.

Witnesses:
J. H. STERLING,
C. D. TWIGLET.